United States Patent
Morman et al.

(10) Patent No.: US 6,785,937 B2
(45) Date of Patent: Sep. 7, 2004

(54) SLIT NECK SPUNBOND PROCESS AND MATERIAL

(75) Inventors: Michael Tod Morman, Alpharetta, GA (US); Gregory Todd Sudduth, Cumming, GA (US); Robert James Gerndt, Roswell, GA (US); Mark G. Kupelian, Atlanta, GA (US); Angela Dobson, Atlanta, GA (US); Patricia Hwang Calhoun, Alpharetta, GA (US); Courtney E. Shea, Atlanta, GA (US); Rasha W. Guirguis, Alpharetta, GA (US); Robert Wright, Peachtree City, GA (US); John Joseph Sayovitz, Marietta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 134 days.

(21) Appl. No.: 10/132,713

(22) Filed: Apr. 24, 2002

(65) Prior Publication Data

US 2003/0200636 A1 Oct. 30, 2003

(51) Int. Cl.$^7$ ................................................ D06C 3/06
(52) U.S. Cl. ................................ 26/71; 26/99; 28/170; 264/289.3
(58) Field of Search ..................... 26/99, 71, 87, 26/100–105, 51, 78, 1, 7, 72; 28/170, 100, 165, 245, 246, 103, 104; 264/288.4, 289.3, 289.6, 291, 288.8, DIG. 73

(56) References Cited

U.S. PATENT DOCUMENTS

| | | | | |
|---|---|---|---|---|
| 3,106,365 A | * | 10/1963 | Karr ............................... 26/87 |
| 3,266,743 A | * | 8/1966 | Moser et al. ............. 242/548.1 |
| 3,503,106 A | * | 3/1970 | Port et al. ....................... 28/170 |
| 3,630,114 A | * | 12/1971 | Bunting et al. ................ 28/170 |
| 3,692,618 A | | 9/1972 | Dorschner et al. |
| 3,802,817 A | | 4/1974 | Matsuki et al. |
| 3,849,241 A | | 11/1974 | Butin et al. |
| 3,981,952 A | | 9/1976 | Ruddell et al. |
| 4,017,227 A | * | 4/1977 | Schmidt ......................... 26/72 |
| 4,041,203 A | | 8/1977 | Brock et al. |
| 4,100,324 A | | 7/1978 | Anderson et al. |
| 4,134,951 A | | 1/1979 | Dow et al. |
| 4,292,266 A | | 9/1981 | Weder et al. |
| 4,340,563 A | | 7/1982 | Appel et al. |
| 4,443,513 A | | 4/1984 | Meitner et al. |
| 4,495,124 A | * | 1/1985 | Van Erden et al. .......... 264/130 |
| 4,663,220 A | | 5/1987 | Wisneski et al. |

(List continued on next page.)

FOREIGN PATENT DOCUMENTS

| | | |
|---|---|---|
| WO | 92/16371 | 10/1992 |
| WO | WO 98/05813 | 2/1998 |
| WO | 00/16974 | 3/2000 |
| WO | 00/29199 | 5/2000 |
| WO | 01/00915 | 1/2001 |
| WO | 01/12427 | 2/2001 |
| WO | 01/30563 | 5/2001 |

*Primary Examiner*—Amy B. Vanatta
(74) *Attorney, Agent, or Firm*—Pauley Petersen & Erickson

(57) ABSTRACT

A process for making a plurality of necked nonwoven strips having similar or identical cross-directional profiles includes the steps of slitting a neckable nonwoven web into a plurality of neckable nonwoven strips, passing the neckable nonwoven web between a first pair of nip rollers having a first surface velocity and a second pair of nip rollers having a second surface velocity greater than the first surface velocity, and necking the nonwoven web between the first pair of nip rollers and the second pair of nip rollers.

26 Claims, 5 Drawing Sheets

U.S. PATENT DOCUMENTS

| | | |
|---|---|---|
| 4,720,415 A | 1/1988 | Vander Wielen et al. |
| 4,741,949 A | 5/1988 | Morman et al. |
| 4,762,520 A | 8/1988 | Wallström |
| 4,789,699 A | 12/1988 | Kieffer et al. |
| 4,965,122 A | 10/1990 | Morman |
| 4,981,747 A | 1/1991 | Morman |
| 5,028,289 A | 7/1991 | Rasmussem |
| 5,114,781 A | 5/1992 | Morman |
| 5,116,662 A | 5/1992 | Morman |
| 5,156,793 A | 10/1992 | Buell et al. |
| 5,244,482 A | 9/1993 | Hassenboehler, Jr. et al. |
| 5,256,353 A | 10/1993 | Leiber et al. |
| 5,290,377 A | 3/1994 | Aihara et al. |
| 5,336,545 A | 8/1994 | Morman |
| 5,366,793 A | 11/1994 | Fitts, Jr. et al. |
| 5,397,514 A | 3/1995 | Breil et al. |
| 5,418,045 A | 5/1995 | Pike et al. |
| 5,492,753 A | 2/1996 | Levy et al. |
| 5,514,470 A | 5/1996 | Haffner et al. |
| 5,560,793 A | 10/1996 | Ruscher et al. |
| 5,707,468 A | 1/1998 | Arnold et al. |
| 5,720,832 A | 2/1998 | Minto et al. |
| 5,755,902 A | 5/1998 | Reynolds |
| 5,789,065 A | 8/1998 | Haffner et al. |
| 5,883,028 A | 3/1999 | Morman et al. |
| 6,001,460 A | 12/1999 | Morman et al. |
| 6,069,097 A | 5/2000 | Suzuki et al. |
| 6,255,236 B1 | 7/2001 | Cree et al. |

* cited by examiner

SLIT NECK SPUNBOND PROCESS AND MATERIAL

FIELD OF THE INVENTION

This invention relates to a process for making necked nonwoven materials and laminates having edge regions with higher basis weight and increased extendibility relative to a central region, and to necked nonwoven materials produced by such process.

BACKGROUND OF THE INVENTION

Necked nonwoven webs, including necked spunbond webs, meltblown webs, combinations and the like, and laminates including nonwoven webs such as spunbond film laminates, are often made using a process which is schematically illustrated in FIG. 1. A nonwoven web 12 having a starting width is passed in a machine direction between a first nip 16, which can be a first pair of nip rollers traveling at a first surface velocity, and a second nip 26, which can be a second pair of nip rollers traveling at a second surface velocity greater than the first surface velocity. The surface velocity difference between the first nip and the second nip results in formation of a necked or narrowed nonwoven web 22 having a necked width which is less than the starting width.

The starting nonwoven web 12 includes edge regions 13 and 15, and a central region 11. The necked nonwoven web 22 includes edge regions 23 and 25, and a central region 21. Because the necking causes the nonwoven fibers to become closer together and more aligned, without noticeably stretching or narrowing the individual fibers, the necked nonwoven web 22 generally has a higher basis weight than the starting nonwoven web 12.

As can be easily seen from FIG. 1, the nonwoven fibers in the edge regions 13 and 15 of the starting nonwoven web travel a greater distance between the first nip 16 and the second nip 26 during the necking process, than the fibers in the central region 11. Further, the cross-directional stresses in the central region 11 are at least partially counteracted, because these stresses are applied in both cross directions. The cross-directional stresses in each of the edge regions 13 and 15 are in one direction, inward toward the central region 11 of the nonwoven web. This results in increased fiber gathering and necking in the edge regions. Consequently, the fibers in the edge regions 23 and 25 of the necked nonwoven web are generally more aligned and closer together than the fibers in the central region 21. As a result, the necked nonwoven web becomes nonuniform in the cross direction, having greater gathering and thus a higher basis weight and extendibility in both edge regions than in the central region. If this necked web is then slit into a desired number of slits, the slits including each edge portion of the necked nonwoven web will have different properties, edge to edge, than the center slits.

There is a need or desire for a necking process which produces similar or identical slit necked nonwoven strips, each having a substantially similar cross-directional profile in basis weight and extendibility.

Definitions

As used herein, the term "comprising" opens the claim to inclusion of additional materials and/or process steps other than those recited.

As used herein, the term "recover" refers to a contraction of a stretched material upon termination of a biasing force following stretching of the material by application of the biasing force. For example, if a necked material having a relaxed, unbiased width of one (1) inch is elongated 50 percent in the cross direction by stretching to a width of one and one half (1.5) inches the material would be elongated 50 percent (0.5 inch) and would have a stretched width that is 150 percent of its relaxed width. If this exemplary stretched material is relaxed, and is recovered to a width of one and one tenth (1.1) inches after release of the biasing and stretching force, the material would have recovered 80 percent (0.4 inch) of its one-half (0.5) inch elongation. Recovery may be expressed as [(maximum stretched dimension minus final sample dimension)/(maximum stretched dimension minus initial sample dimension)]×100.

As used herein, the term "nonwoven web" means a web that has a structure of individual fibers of threads which are interlaid, but not in an identifiable repeating manner. Nonwoven webs have been, in the past, formed by a variety of processes such as, for example, spunbonding processes, meltblowing processes and bonded carded web processes.

As used herein, the term "microfibers" means small diameter fibers having an average diameter not greater than about 75 microns, for example, having a diameter of from about 0.5 microns to about 75 microns, more specifically microfibers may also have an average diameter of from of from about 4 microns to about 40 microns.

As used in herein, the term "interfiber bonding" means bonding produced by thermal bonding or entanglement between the individual nonwoven fibers to form a coherent web structure. Fiber contact bonding and entangling are inherent in the meltblown processes but may be generated or increased by processes such as, for example, hydraulic entangling or needle punching. One or more thermal bonding steps are employed in most processes for forming spunbond webs. Alternatively or additionally, a bonding agent can be utilized to increase the desired bonding and to maintain structural coherency of the web. For example, powdered bonding agents and chemical solvent bonding may be used.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameters, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, the disclosure of which is hereby incorporated by reference.

As used herein, the term "spunbonded fibers" refers to small diameter fibers which are formed by extruding a molten thermoplastic material as filaments from plurality of fine, usually circular, capillaries in a spinneret with the diameter of the extruded filaments then being rapidly reduced, for example, by eductive drawing or other well-known spun bonding mechanisms. The production of spunbonded nonwoven webs is illustrated in patents such as, for example, in U.S. Pat. No. 3,802,817 to Matsuki et al., U.S. Pat. No. 4,340,563 to Appel et al., and U.S. Pat. No. 3,692,618 to Dorschner et al. The disclosures of these patents are hereby incorporated by reference.

"Necked" or "neck stretched" are interchangeable terms and refer to a method of elongating a nonwoven fabric, generally in the longitudinal, or machine direction, to reduce its width in a controlled manner to a desired amount. The controlled stretching may take place under cool, room temperature or greater temperatures and is limited to an increase in overall dimension in the direction being stretched up to the elongation required to break the fabric, which in many cases is about 1.05 to 1.7 times. When relaxed, the web returns toward its original dimensions. Such a process is disclosed, for example, in U.S. Pat. Nos. 4,443,513 to Meitner and Notheis; U.S. Pat. Nos. 4,965,122, 4,981,747 and 5,114,781 to Morman; and U.S. Pat. No. 5,244,482 to Hassenboehler Jr. et al.

As used herein, the term "necked material" refers to any material which has been constricted in at least one dimension by processes such as, for example, drawing.

As used herein, the term "neckable material" means any material which can be necked.

As used herein, the term "reversibly necked material" refers to a necked material that has been treated while necked to impart memory to the material so that, when a force is applied to extend the material to its prenecked dimensions, the necked and treated portions will generally recover to their necked dimensions upon termination of the force. One form of treatment is the application of heat. Generally, extension of the reversibly necked material is substantially limited to extension to its prenecked dimensions. Therefore, unless the material is elastic, extension too far beyond its prenecked dimensions will result in material failure. A reversibly necked material may include more than one layer, for example, multiple layers of spunbond web, multiple layers of meltblown web, multiple layers of bonded carded web or any other suitable combination or mixtures thereof, including laminates containing a film and/or a foam, as described for example in U.S. Pat. No. 4,965,122, the disclosure of which is incorporated herein by reference.

As used herein, the term "polymer" generally includes, but is not limited to homopolymers, copolymers, such as for example, block, graft, random and alternating copolymers, terpolymers, etc. and blends and modifications thereof. Further, unless otherwise specifically limited, the term "polymer" shall include all possible geometrical configurations of the material. These configurations include, but are not limited to, isotactic, syndiotactic and random symmetries.

SUMMARY OF THE INVENTION

The present invention is directed to a process for making a necked material, for example a necked nonwoven web having better cross-directional basis weight uniformity and extendibility uniformity strip to strip, and to necked nonwoven webs produced by such process. A nonwoven web, for example a polypropylene spunbond web, which may be unwound from a roll or provided directly from a spunbond process, is pulled in a machine direction by a first pair of counter rotating nip rollers and a second pair of counter rotating nip rollers. In certain embodiments of this invention, the polypropylene spunbond web may be formed from a polypropylene homopolymer, or a random propylene-ethylene copolymer containing up to 10% by weight ethylene and at least 90% by weight propylene. As the nonwoven web moves in the machine direction, it is slit in the machine direction by a plurality of knives or other slitting devices, causing formation of a plurality of nonwoven strips.

The nonwoven strips may pass straight between the first nip rollers or may pass between the first nip rollers in another configuration, such as an S-wrap fashion. The nonwoven strips can also wrap around rolls with surfaces having a higher coefficient of friction to put tension on the strips and draw the strips. The drawing tension can also result from pulling the material directly off a supply roll and controlling the speed of the unwinding roll. After passing between the first nip rollers, the nonwoven strips enter a necking zone, defined as the distance between the first nip rollers and a second pair of nip rollers. A through-air heating oven or another suitable heating device may be provided in the necking zone to heat the nonwoven strips. A suitable temperature for a spunbond web is about 180° F. (82° C.) to about 280° F. (138° C.) or about 85° C. to about 30° C. below its melting point. The supplied heat increases the degree of necking before breaking and may also cause the necked nonwoven strips to become heat set (reversibly necked). Nonwoven setting can also occur by ageing freshly spun fibers in a necked configuration on a slit roll.

The second nip rollers turn at a surface velocity greater than the first nip rollers, suitably about 5% to about 40% greater than the first nip rollers. The increased speed of the second nip rollers relative to the first nip rollers and the heat applied to the nonwoven strips in the necking zone cause each of the nonwoven strips to become necked or narrowed from an initial or starting width to a necked width which is less than the initial width, suitably about 20% to about 80% of the initial width, resulting in the formation of necked nonwoven strips. The second nip rollers can have an outer surface with a higher coefficient of friction to put tension on the strips and draw the strips. The necked nonwoven strips may each have a necked width of at least about 2 inches, and may be substantially wider depending on the initial width of the nonwoven web, the number of nonwoven strips formed in the nonwoven web and the amount of necking.

The necking causes the filaments in each nonwoven strip to become more machine-direction aligned and compact, and does not cause significant elongation of individual nonwoven filaments. As a result, each necked nonwoven strip has a higher basis weight than its basis weight prior to necking. By slitting the nonwoven web into narrower strips, the resulting adjacent necked nonwoven strips are similar or identical, each strip having a similar cross-sectional profile in both basis weight and extendibility. Each necked nonwoven strip can be easily stretched in the cross direction by between about 25% to about 500% of its necked width. If the necked nonwoven strip is heat set (reversibly necked) it may then recover toward its necked width upon release of the stretching force.

The features and advantages of the invention will become further apparent from the following detailed description of the invention, read in conjunction with the accompanying drawings. The detailed description and drawings are intended to be illustrative of the invention rather than limiting, the scope of the invention being defined by the appended claims and equivalents thereof.

DETAILED DESCRIPTION OF THE INVENTION

Figure 4:
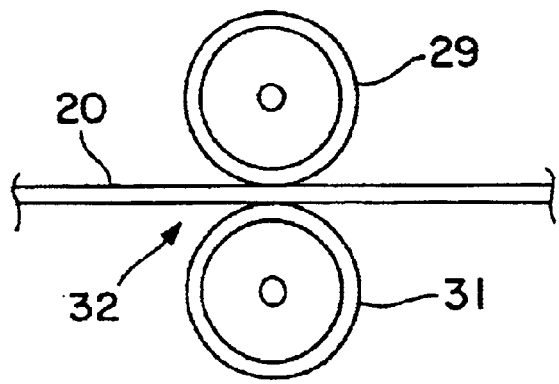
FIG. 4 illustrates a necking process in which the neckable material passes between a pair of counter rotating nip rollers, for example the first pair of nip rollers, in accordance with one embodiment of this invention.
Figure 5:
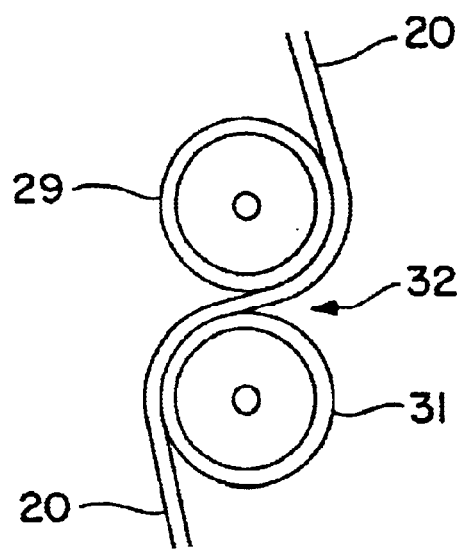
FIG. 5 illustrates a necking process in which the neckable material passes between a pair of counter rotating nip rollers in an S-wrap fashion, for example the first pair of nip rollers, in accordance with one embodiment of this invention.
Figure 6:
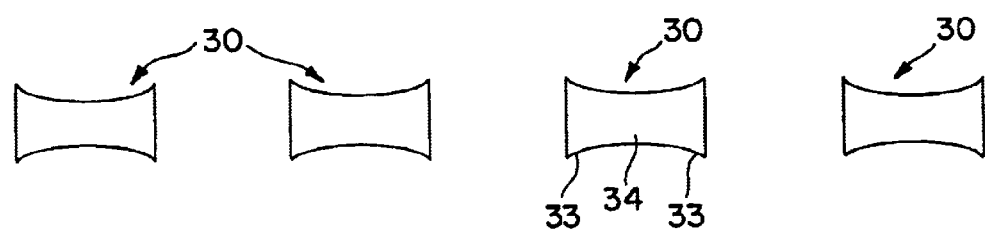
FIG. 6 is a schematic cross-sectional view of a nonwoven web produced in accordance with one embodiment of this invention, wherein each slit is similar or identical to adjacent slits having a slight "smile" profile in basis weight and extendibility.

Referring to FIGS. 2–5, in accordance with one embodiment of this invention, a neckable material 20, for example a nonwoven web, is slit or cut into a plurality of neckable material strips 30 and each neckable material strip 30 is necked in a machine direction 10 by passing the neckable material strips 30 through a series of nip rollers. Referring to FIG. 6, each necked material strip 30 has a cross-directional basis weight and a cross-directional extendibility profile substantially similar or identical to adjacent necked material strips 30. Further, each necked material strip 30 has laterally opposing side edge portions or regions 33 having a higher basis weight and a higher extendibility than a basis weight and an extendibility of a central portion or region 34, as a result of the necking process.

The process in accordance with certain embodiments of this invention may be used to produce components for personal care articles, such as diapers, training pants, adult care garments and the like. The material produced in accordance with the process of the present invention is particularly useful for localized areas of such personal care articles where high extendibility is desired.

The neckable material 20 may be formed by known nonwoven processes, such as, for example, meltblowing processes, spunbonding processes or bonded carded web processes and passed directly through a first nip 32 without first being stored on a supply roll 18. The neckable material 20 may be nonwoven materials formed of bicomponent fibers, for example, as disclosed in U.S. Pat. No. 5,418,045 to Pike et al., the disclosure of which is incorporated herein by reference. In accordance with certain embodiments of this invention, the neckable material 20 may further comprise a film. Desirably, but not necessarily, the film is a non-elastic film.

In one embodiment of this invention, the neckable material 20 desirably is a single layer of material such as, for example, a spunbond web having a basis weight of from about 0.2 osy to about 10 osy or a meltblown web having a basis weight of from about 0.2 osy to about 8 osy. If the neckable material 20 is a web of meltblown fibers, it may include meltblown microfibers. The neckable material 20 may be made from any material that can be treated while necked so that, after treatment, upon application of a force to extend the necked material to its prenecked dimensions, the material recovers generally to its necked dimensions upon termination of the force. A method of treatment is the application of heat. Certain polymers such as, for example, polyolefins, polyesters and polyamides may be heat treated under suitable conditions to impart such memory. Exemplary polyolefins include one or more of polyethylene, polypropylene, polybutene, ethylene copolymers, propylene copolymers and butene copolymers. Suitable polypropylenes include, for example, polypropylene available from the Himont Corporation under the trade designation PF-374, polypropylene available from the Exxon-Mobil Chemical Company under the trade designation Escorene® PD-3445, and polypropylene available from the Shell Chemical Company under the trade designation DX 5A09. Polyethylenes may also be used, including ASPUN® 6811A and 2553 linear low density polyethylenes from the Dow Chemical Company, as well as various high density polyethylenes. Chemical characteristics of these materials are available from their respective manufacturers.

The neckable material 20 may also be a composite material made of a mixture of two or more different fibers or a mixture of fibers and particulates. Such mixtures may be formed by adding fibers and/or particulates to a gas stream in which meltblown fibers are carried so that an intimate entangled commingling of meltblown fibers and other materials, e.g., wood pulp, staple fibers or particulates such as, for example, superabsorbent materials, occurs prior to collection of the fibers upon a collecting device to form a coherent web of randomly dispersed meltblown fibers and other materials, such as disclosed in U.S. Pat. No. 4,100,324 to Anderson et al. and U.S. Pat. No. 5,720,832 to Minto et al., the disclosures of which are incorporated herein by reference.

If the neckable material 20 is a nonwoven web of fibers, the fibers may be joined by interfiber bonding using one or more of the bonding processes described in the foregoing definition of "interfiber bonding."

In one embodiment of the invention, the neckable material 20 is a multilayer material having, for example, at least one layer of spunbond web joined to at least one layer of meltblown web, bonded carded web, film, foam or other suitable material. For example, the neckable material 20 may be a multilayer material wherein at least one layer is a spunbond and at least one layer is a meltblown, such as a spunbond/meltblown/spunbond ("SMS") laminate as disclosed, for example in the U.S. Patents incorporated herein by reference. One particularly suitable neckable material 20 may include the nonwoven fabric-like material disclosed in U.S. Pat. No. 4,041,203 to Brock et al., the disclosure of which is incorporated herein by reference. Such a laminate may be made by sequentially depositing onto a moving forming belt first a spunbond fiber layer, then a meltblown fiber layer and last another spunbond fiber layer, and then bonding the laminate in a manner described in the aforementioned patents. Alternatively, the fabric layers may be made individually, collected in rolls, and combined in a separate bonding step. The above stated processes are well known in the art and need not be reviewed herein. In one embodiment of this invention, the multilayer laminate includes a first layer of spunbond polypropylene having a basis weight from about 0.2 ounces per square yard (osy) to about 8 osy, a layer of meltblown polypropylene having a basis weight from about 0.1 osy to about 4 osy, and a second layer of spunbond polypropylene having a basis weight of about 0.2 osy to about 8 osy.

Figure 1:
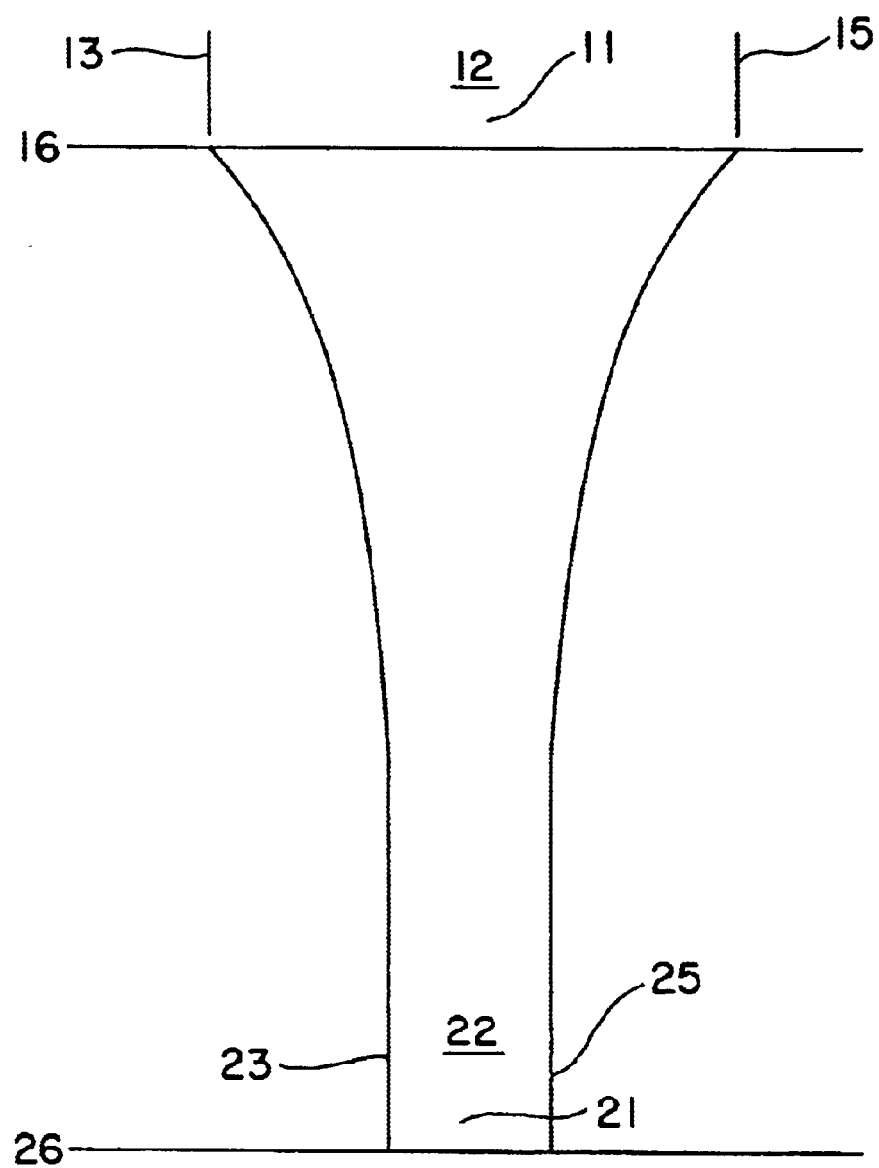
FIG. 1 schematically illustrates a conventional necking process step, as described in the foregoing "Background of the Invention"
Figure 2:
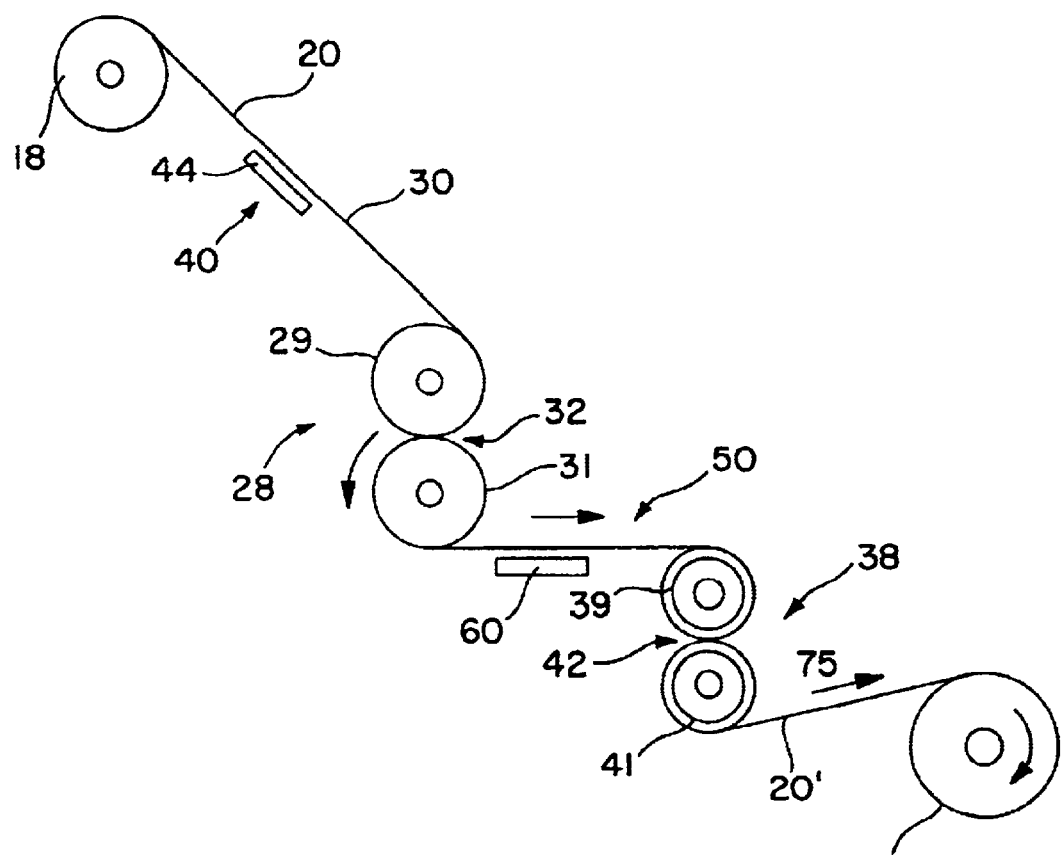
FIGS. 2 and 3 schematically illustrate a necking process in which a neckable material, for example a nonwoven web, is slit or cut into a plurality of neckable material strips and each material strip is necked, in accordance with one embodiment of this invention.

As shown in FIG. 2, the neckable material 20 may be unwound from a material supply roller 18 and transported to and fed through a first transporting means, for example the first nip 32 formed between a first pair of nip rollers 28 comprising roller 29 and roller 31. Suitably, the neckable material 20 has an initial prenecked or starting width of about 30 inches to about 720 inches, desirably about 100 inches to about 540 inches. The first pair of nip rollers 28 pull the neckable material 20 through the rollers 29 and 31 in the machine direction 10. It is apparent to those having ordinary skill in the art that the neckable material 12 may be fed, during an inline process, directly from a neckable material forming process, for example a spunbond process, rather than unwound from the supply roller 18. The neckable material 20 may pass directly through the nip 32 formed by the counter rotating first pair of nip rollers 29, 31, as shown in FIG. 4 or the neckable material 20 may travel a path having a general S-configuration, as shown in FIG. 5. As shown in FIG. 5, the neckable material 20 passes partially around and underneath the roller 29, then between the roller 29 and the roller 31, then partially around and over the roller 31. The roller 29 and the roller 31 rotate in opposite directions with each roller 29, 31 desirably, but not necessarily, having an equal and constant first rotational surface velocity. In accordance with one embodiment of this invention, the rollers 29 and 31 may be heated to a constant temperature across a lateral direction of each roller 29, 31 or selectively heated according to a profile which yields higher temperatures in a first portion of the roller surface and a relatively lower temperature in a second portion of the roller surface.

Figure 3:
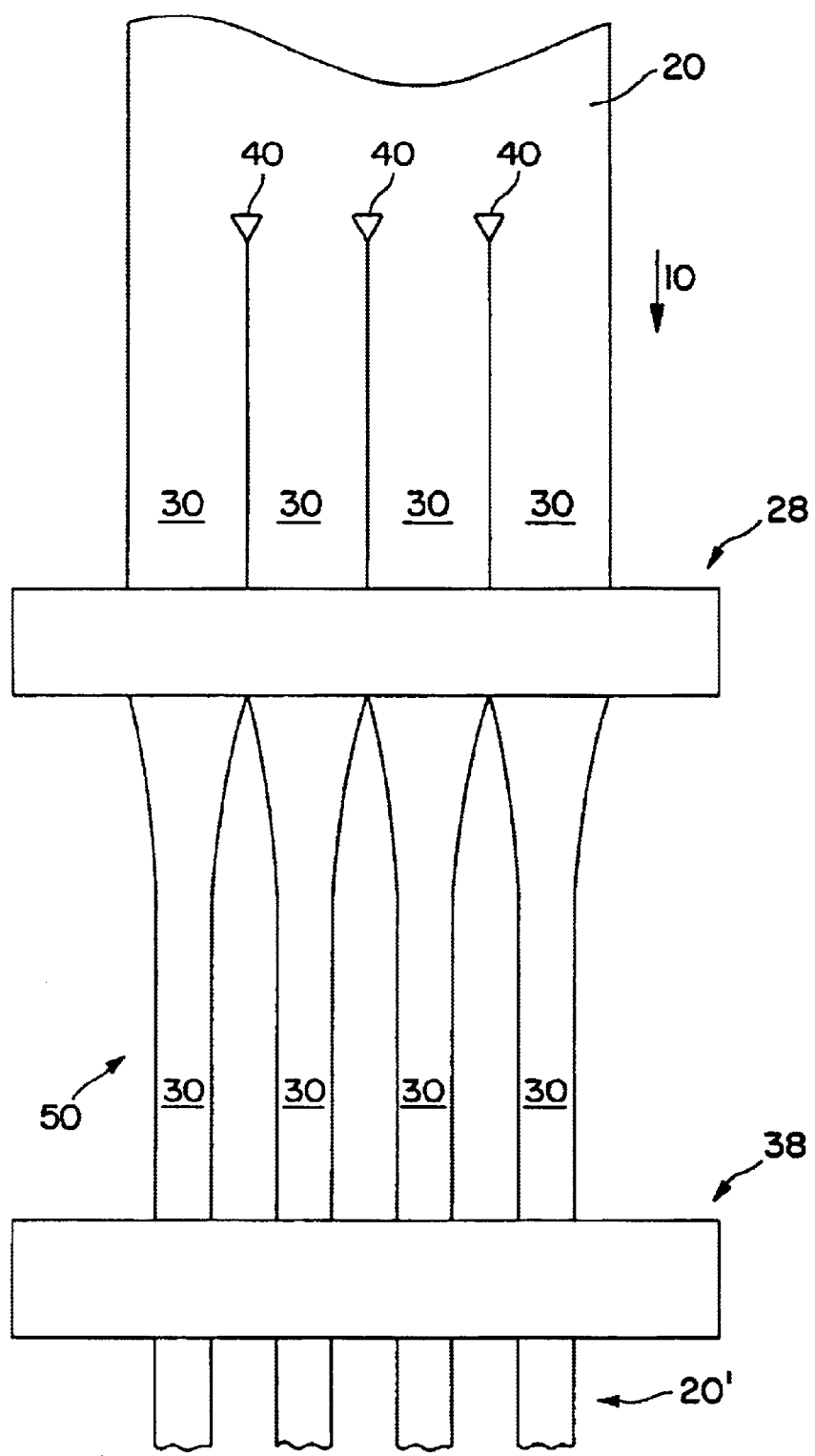

As shown in FIGS. 2 and 3, prior to passing through the first nip 32, the neckable material 20 is slit or cut longitudinally into a plurality of neckable material strips 30 using a suitable cutting means 40, for example a plurality of cutting knives 44. Any suitable slitting or cutting means known to those having ordinary skill in the art may be used to form neckable material strips 30. Desirably, but not necessarily, the neckable material strips 30 have a uniform width. Suitably, the neckable material 20 is cut into at least about two (2) neckable material strips 30, desirably at least about six (6) neckable material strips 30, and in some cases at least about twenty (20) neckable material strips 30. Prior to necking, the neckable material strips 30 may each have a width of about 9 inches to about 90 inches, suitably about 15 inches to about 72 inches, desirably about 20 inches to about 54 inches.

For example, the neckable material 20 having an initial or starting width of about 360 inches may be cut into ten (10) neckable material strips 30 with each neckable material strip 30 having a width of about 36 inches. Alternatively, the neckable material 20 may be cut into thirty (30) neckable material strips 30 each having a width of about 12 inches. It is apparent to those having ordinary skill in the art that the neckable material 20 may be cut to form any suitable number of neckable material strips 30, depending upon the starting width of the nonwoven web, the degree of necking and the desired width of the final product.

After passing between the first pair of nip rollers 28, the neckable material 20 comprising the plurality of neckable material strips 30 enters a necking zone 50, defined as a longitudinal (necking) distance in the machine direction 10 between the first pair of nip rollers 28 and a second pair of nip rollers 38, as shown in FIG. 3. To get good necking, often a necking distance between nips of 4 to 10 times the web width is required. If the web is slit into "y" strips before necking, this distance becomes (4/y) to (40/y) times the width of the original web. This relatively short necking distance, made possible by slitting the neckable nonwoven material into a plurality of neckable strips, saves factory floor space and produces necked nonwoven strips having a substantially similar basis weight and cross-directional extendibility profile. In one embodiment of this invention, a heating device 60 shown schematically in FIG. 2, for example a heating oven or any other suitable heating device known to those having ordinary skill in the art, may be provided in the necking zone 50. Desirably, the heating device 60 heats each material strip 30 to an elevated temperature of about 180° F. (82.2° C.) to about 280° F. (138° C.). Suitably, the necking distance is less than about 40 times the slit width, desirably about 20 times the slit width, more desirably about 10 times the slit width and in certain cases about 4 times the slit width, to ensure good web control of the slit. The necking distance should be great enough to give the fibers making up the materials enough time to orient and move to enable the material necking process to occur.

The heating device 60 can be a conventional open-ended forced air oven, through which the neckable material 20 may pass as it travels between the first pair of nip rollers 28 and the second pair of nip rollers 38. The open-ended forced air oven may be used to aid in necking each neckable material strip 30 and heat setting each neckable material strip 30, at location 75 as shown in FIG. 2, resulting in a reversibly necked material. The temperature inside the oven should be high enough to soften the nonwoven fibers and increase their pliability, but not so high as to either melt the fibers or soften the fibers to such an extent that the necking process causes significant stretching, narrowing and/or breaking of individual nonwoven fibers. When the nonwoven fibers are made from a polyolefin, for example, the highest temperature reached by the nonwoven web inside the oven should be at least about 20° C. below the melting temperature of the fibers, suitably at least about 25° C. below the melting temperature of the fibers, desirably at least about 30° C. below the melting temperature of the fibers. Optimal necking temperatures are typically about 30° C. to about 85° C. below the melting temperature of the fibers. When the neckable material 20 is a nonwoven web comprising a spunbond polypropylene web, for example, a desired necking temperature is about 80° C. to about 138° C.

Alternatively, the heating device 60 may be a hot air knife as described, for example, in U.S. Pat. No. 5,707,468 to Arnold et al., the disclosure of which is incorporated herein by reference. In a hot air knife assembly, one or more high velocity jets of hot air are applied to the surface of the neckable material 20 through a device which includes an upper plenum and a lower slot or slots facing the moving neckable material 20.

"Setting" is thought to occur when the fibers making up the nonwoven are going through a crystallization process, i.e. the crystallinity is increasing. This additional crystallization is thought to put a memory into the fibers that makes the fibers want to return to the configuration they were in when the were set. One method of setting is to heat the aged nonwoven fibers to cause additional crystallization to occur in the fibers. Another method is to take a freshly made nonwoven with fibers that are still going through the fiber forming crystallization process and put the nonwoven in its desired configuration, i.e., in a necked configuration. The necked material then receives its set from aging (additional crystallization) of the fibers on a roll.

In accordance with one embodiment of this invention, the freshly made nonwoven material is slit and necked prior to setting. The crystallization process occurs rapidly after the fibers form. However, if the nonwoven material is slit and necked within about 1 minute, desirably within about 0.5 minutes, and more desirably within about 0.25 minutes, of making the nonwoven material, sufficient crystallization occurs subsequent to slitting and necking to set the material in the necked configuration.

After passing through the necking zone 50, the neckable material 20 is pulled by a second transporting means. For example, in one embodiment of this invention, the second transporting means may comprise a winding roll, such as a storage or winding roll 70, as shown in FIG. 2. The winding roll has a constant rotational surface velocity greater than the first surface velocity of rollers 29 and 31, thereby necking each material strip 30 prior to winding the necked material strips 30 onto the winding roll.

Alternatively, in one embodiment of this invention, the second transporting means may comprise a second pair of nip rollers 38 comprising counter rotating roller 39 and roller 41. The neckable material 20 may pass directly through a second nip 42 formed by the counter rotating second pair of nip rollers 38 or the neckable material 20 may travel a path having a general S-configuration wherein the neckable material 20 passes partially around and underneath the roller 39, then between the roller 39 and the roller 41, then partially around and over the roller 41. In one embodiment of this invention, the rollers 39 and 41 may be heated in a similar manner as discussed above, in reference to rollers 29 and 31.

Each roller 39 and 41 has a constant second rotational surface velocity greater than the first surface velocity of roller 29 and 31. Suitably, the second surface velocity is about 1.05 times to about 1.7 times greater than the first surface velocity, desirably about 1.1 times to about 1.5 times the first surface velocity, and in some cases about 1.2 times to about 1.4 times the first surface velocity. The surface velocity difference between the first pair of nip rollers 28 and the second pair of nip rollers 38, and in certain embodiments the heat applied to the neckable material 20 in the necking zone 50, results in formation of a narrower or necked material 20' having a necked width which is less than the initial or starting width of the neckable material 20.

Generally, the minimum required distance between nips for good necking is approximately proportional to the width of the nonwoven being necked. That is, all other material and process conditions being held constant, doubling the width of a web approximately doubles the minimum required distance between nips for good necking. Conversely, if a nonwoven having a minimum required distance between nips for good necking of "X" for a given set of processing conditions is slit into "N" individual strips, the minimum required distance for good necking at those same processing conditions is reduced to approximately "X/N". For example, if "N" equals 10 strips, the minimum required distance between nips for good necking is reduced 90 percent.

Further, the minimum required distance between nips for good necking is generally related to the line speed. That is, if the line speed is doubled, the minimum required distance for good necking increases. The line speed divided by the distance between nips is the time the material is in the necking zone between nips. Decreasing this time by increasing line speed may not give the filaments in the material enough time to reorient. This reorientation is what causes the necking to occur.

As discussed above, the minimum distance between nips for good necking can be decreased by slitting a nonwoven web into strips. This reduction in minimum distance can be used on an existing machine to increase line speeds and still attain acceptable necking. These trends can be used in the following examples.

In general, if a nonwoven web has an initial width of about 100 inches (N=1), and a time (T) of about 0.1 minutes is required for necking the nonwoven web, then the longitudinal distance must equal the second surface velocity times 0.1 minutes. If the second surface velocity is about 400 ft./min., the longitudinal distance must be about 40 feet. However, if the nonwoven web is slit longitudinally into ten (10) equal nonwoven strips (N=10) each having an initial width of about 10 inches, the necking time (T) is decreased to about 0.01 minutes, i.e. (0.1 minutes/10 nonwoven strips). Thus, at a second surface velocity of about 400 ft./min., the longitudinal distance must be about 4 feet.

It has been found that, in general, for a given web necked to a given amount, the ratio of web width times line speed divided by distance between draw nips must be less than a given value determined experimentally. If the effective web width can be reduced by slitting the web before necking, the line speed can be proportionally increased and/or the nip distance decreased. For example, if the web is slit into twelve (12) equal slits, in general the line speed can be increased three times and the necking distance decreased to ¼ of an initial or original necking distance.

In accordance with certain embodiments of this invention, each neckable material strip 30 is necked from an initial or starting width to a necked width which is less than its initial width within the necking zone 50. Suitably, the necked or final width of each material strip 30 is less than about 80% of the initial width of the material strip 30, desirably less than about 65% of the initial width of the material strip 30, and in some cases about 28% to about 50% of the initial width of the neckable material strip 30. Each material strip 30 may have a necked width of at least about 2 inches, and is often wider depending on the dimensional requirements of the end use product. In certain embodiments of this invention, the necked width of each neckable material strip 30 may be substantially wider depending on the initial prenecked width of the neckable material strips 30 and the amount of necking. Additionally, each necked material strip 30 may have a necked machine direction length which is about 1.05 times to about 1.7 times, suitably about 1.1 times to about 1.5 times, desirably about 1.2 times to about 1.4 times its initial starting length caused by the drawing process. After the necking process is completed, the necked material strips 30 may be processed or converted inline or may be wound onto a storage or winding roll 70 for future processing and/or converting.

In accordance with one embodiment of this invention, the neckable material 20 comprises an SMS laminate formed using any suitable method known to those having ordinary skill in the art or available from Kimberly-Clark Corporation, Dallas, Tex., U.S.A., as a line under the trademark BLOCK-IT. The neckable SMS laminate, having a first or initial prenecked width, is transported toward the first pair of nip rollers 28 having a first surface velocity. Before the SMS laminate reaches the first pair of nip rollers 28, the SMS laminate is continuously slit longitudinally into a plurality of laminate strips, using suitable slitting means 40.

The laminate strips are passed longitudinally between the first pair of nip rollers 28 and the SMS laminate moves a longitudinal distance to the second pair of counter rotating nip rollers 38 having a second surface velocity which is greater than the first surface velocity. The SMS laminate is fed or passed longitudinally between the second pair of nip rollers 38 to cause necking of the laminate strips between the first pair of nip rollers 28 and the second pair of nip rollers 38. The SMS laminate travels the longitudinal distance between the first pair of nip rollers 28 and the second pair of nip rollers 38 defined as the necking zone 50, wherein the laminate strips are necked as a result of the second pair of nip rollers 38 having a greater surface velocity than the first pair of nip rollers 28.

Suitably, the longitudinal distance between the first pair of nip rollers 28 and the second pair of nip rollers 38 is not greater than about ten times a prenecked width of an individual strip 30, desirably not greater than about eight times the prenecked width of strip 30, and in some cases not greater than about six times the prenecked width of the strip 30 for slit control.

Referring to FIG. 6, the process in accordance with the one embodiment of this invention provides a nonwoven web forming a plurality of necked material strips 30, wherein adjacent strips 30 suitably have a similar, and desirably identical slight "smile" profile in basis weight and extendibility. As shown in FIG. 6, each strip 30 includes laterally opposing edge portions or regions 33 having a higher basis weight and higher extendibility than a basis weight and extendibility of the central portion or region 34.

While the embodiments of the invention disclosed herein are presently preferred, various modifications and improvements can be made without departing from the invention. The scope of the invention is indicated in the appended claims, and all changes that fall within the meaning and range of equivalents are intended to be embraced therein.

We claim:

1. A process for preparing a necked material comprising the steps of:
    transporting a neckable nonwoven web having a first width toward a first pair of counter rotating nip rollers having a first surface velocity;
    longitudinally slitting the nonwoven web into a plurality of nonwoven strips before the nonwoven web reaches the first pair of nip rollers;
    longitudinally passing the nonwoven strips between the first pair of nip rollers;
    moving the nonwoven strips a longitudinal distance to a second pair of counter rotating nip rollers having a second surface velocity which is greater than the first surface velocity; and
    longitudinally passing the nonwoven strips between the second pair of nip rollers to cause necking of the nonwoven strips between the first pair of nip rollers and the second pair of nip rollers;
    wherein the longitudinal distance is not greater than about forty times a prenecked width of an individual nonwoven strip.

2. The process of claim 1 wherein the longitudinal distance is not greater than about thirty times a prenecked width of an individual nonwoven strip.

3. The process of claim 1 wherein the longitudinal distance is not greater than about twenty times a prenecked width of an individual nonwoven strip.

4. The process of claim 1 wherein the plurality of nonwoven strips comprises at least 4 nonwoven strips.

5. The process of claim 1 wherein the plurality of nonwoven strips comprises at least 10 nonwoven strips.

6. The process of claim 1 wherein the plurality of nonwoven strips comprises at least 20 nonwoven strips.

7. The process of claim 1 wherein each nonwoven strip has an initial width of about 9 inches to about 90 inches.

8. The process of claim 1 wherein each nonwoven strip has an initial width of about 18 inches to about 72 inches.

9. The process of claim 1 wherein each nonwoven strip has a necked width of about 28% to about 50% of an initial width of the nonwoven strip.

10. The process of claim 1 further comprising the step of heating the nonwoven strips as they travel between the first pair of nip rollers and the second pair of nip rollers.

11. The process of claim 1 wherein the second surface velocity is about 1.05 times to about 1.7 times the first surface velocity.

12. The process of claim 1 wherein the second surface velocity is about 1.1 times to about 1.5 times the first surface velocity.

13. The process of claim 1 wherein the second surface velocity is about 1.2 times to about 1.4 times the first surface velocity.

14. The process of claim 1 wherein the neckable nonwoven web comprises a spunbond web.

15. The process of claim 14 wherein a film is laminated to the spunbond web.

16. A process for preparing a plurality of necked material strips comprising the steps of:
    longitudinally slitting a neckable material into a plurality of neckable material strips, each neckable material strip having a prenecked width;
    longitudinally passing the plurality of neckable material strips between a first pair of nip rollers having a first surface velocity;
    moving the plurality of neckable material strips a longitudinal distance to a second pair of counter rotating nip rollers having a second surface velocity which is greater than the first surface velocity, the ratio of the longitudinal distance to second surface velocity remaining constant; and
    longitudinally passing the plurality of neckable material strips between the second pair of nip rollers, wherein each neckable material strip is necked to a necked width of less than about 70% of its prenecked width.

17. The process of claim 16 wherein each neckable material strip has a necked width of less than about 60% of its prenecked width.

18. The process of claim 16 wherein each neckable material strip has a necked width of about 28% to about 50% of its prenecked width.

19. The process of claim 16 wherein a longitudinal distance from the first pair of nip rollers to the second pair of nip rollers is not more than about ten times a prenecked width of an individual neckable material strip.

20. The process of claim 16 wherein the neckable material comprises a freshly made nonwoven material.

21. The process of claim 20 wherein the neckable material is slit and each neckable material strip is necked within about 1 minute of making the nonwoven material.

22. The process of claim 20 wherein the neckable material is slit and each neckable material strip is necked within about 0.5 minute of making the nonwoven material.

23. The process of claim 20 wherein the neckable material is slit and each neckable material strip is necked within about 0.25 minute of making the nonwoven material.

24. A process for preparing a necked SMS laminate comprising the steps of:
    transporting a neckable SMS laminate having a first width toward a first pair of counter rotating nip rollers having a first surface velocity;
    longitudinally slitting the SMS laminate into a plurality of laminate strips before the SMS laminate reaches the first pair of nip rollers;
    longitudinally passing the laminate strips between the first pair of nip rollers;
    moving the laminated strips a longitudinal distance to a second pair of counter rotating nip rollers having a second surface velocity which is greater than the first surface velocity; and
    longitudinally passing the laminate strips between the second pair of nip rollers to cause necking of the laminate strips between the first pair of nip rollers and the second pair of nip rollers;

wherein the longitudinal distance is not greater than about 25% of the first width.

25. The process of claim 24 wherein the necked SMS laminate comprises a film.

26. A process for preparing a necked material comprising the steps of:

transporting a neckable nonwoven web having a first width toward a first transporting means having a first surface velocity;

longitudinally slitting the nonwoven web into a plurality of nonwoven strips before the nonwoven web reaches the first transporting means;

longitudinally passing the nonwoven strips through the first transporting means;

moving the nonwoven strips a longitudinal distance to a second transporting means having a second surface velocity which is greater than the first surface velocity; and longitudinally passing the nonwoven strips through the second transporting means to cause necking of the nonwoven strips between the first transporting means and the second transporting means;

wherein the longitudinal distance is not greater than about forty times a prenecked width of an individual nonwoven strip.

* * * * *

UNITED STATES PATENT AND TRADEMARK OFFICE
CERTIFICATE OF CORRECTION

PATENT NO. : 6,785,937 B2
DATED : September 7, 2004
INVENTOR(S) : Michael Tod Morman et al.

It is certified that error appears in the above-identified patent and that said Letters Patent is hereby corrected as shown below:

<u>Column 12,</u>
Line 11, change "laminated" to -- laminate --.

Signed and Sealed this

Fourteenth Day of December, 2004

JON W. DUDAS
*Director of the United States Patent and Trademark Office*